United States Patent [19]

Tsukada

[11] 4,317,235
[45] Feb. 23, 1982

[54] SYSTEM FOR TRANSMITTING OPTICAL BINARY DATA SIGNALS THROUGH AN OPTICAL FIBER WITH PILOT PULSES INSERTED BETWEEN TWO WIDE SPACED SUCCESSIONS OF DATA SIGNALS

[75] Inventor: Kazumasa Tsukada, Tokyo, Japan

[73] Assignee: Nippon Electric Co., Ltd., Tokyo, Japan

[21] Appl. No.: 147,685

[22] Filed: May 7, 1980

[30] Foreign Application Priority Data

May 10, 1979 [JP] Japan ................... 54-57498

[51] Int. Cl.³ .............................. H04B 9/00
[52] U.S. Cl. ..................... 455/607; 370/98; 375/113; 455/601; 455/608
[58] Field of Search ............... 455/601, 606, 607, 608, 455/617, 618; 370/1, 4, 74, 98; 375/113, 117

[56] References Cited

U.S. PATENT DOCUMENTS 3,532,889 10/1970 Kompfner .................... 455/617
3,546,465 12/1970 Arnaud ...................... 455/617

Primary Examiner—Joseph A. Orsino, Jr.
Attorney, Agent, or Firm—Sughrue, Mion, Zinn, Macpeak and Seas

[57] ABSTRACT

For effective use of the optical energy and yet proper operation of an automatic gain or threshold control circuit comprised by a receiver of an optical data transmission system, a transmitter of the system produces an optical binary signal with at least one optical pilot pulse inserted between two sequences of optical data pulses only when the two sequences are spaced wider from each other than a predetermined interval that would render the control circuit no more operative and would thereby adversely affect correct reproduction of the data from an electrical binary signal derived from the received optical binary signal through the control circuit. By making the pilot pulses appear more than a first prescribed duration after the last data pulse of the preceding sequence and a second prescribed duration before the first data pulse of the succeeding sequence, electrical pilot pulse or pulses present in the electrical binary signal are removed without deforming the reproduced data if each prescribed duration is longer than the pulse width of the electrical pilot pulse and furthermore a sum of the prescribed durations and the pulse width is not longer than the predetermined interval. The removal is possible by providing the electrical binary signal with successive delays decided in consideration of the prescribed durations and the pulse width and carrying out logic operation on the electrical binary signal and the successively delayed signals if each optical data pulse lasts longer than a sum of the delays.

5 Claims, 7 Drawing Figures

SYSTEM FOR TRANSMITTING OPTICAL BINARY DATA SIGNALS THROUGH AN OPTICAL FIBER WITH PILOT PULSES INSERTED BETWEEN TWO WIDE SPACED SUCCESSIONS OF DATA SIGNALS

BACKGROUND OF THE INVENTION

This invention relates to a system for optically transmitting data as optical pulses through an optical fiber that serves as a data bus. Such a system will herein be referred to as an optical data transmission system. More particularly, this invention relates to an optical data transmission system comprising an automatic gain or threshold control facility known in the art. When the optical data transmission system comprises a central processing unit, the data may include commands generated by the central processing unit. This invention relates also to a transmitter, a receiver, and/or a data bus coupler for use in an optical data transmission system.

An optical data transmission system is excellent as a data transmission system particularly when it is inevitable to install a data bus through a location where a strong electric field is variable with time. This is because optical fibers are free from electromagnetic induction. An optical data transmission system comprising a central processing unit is therefore quite useful as a measuring and controlling system such as, for example, a centralized supervision and remote control system for collecting data from a number of devices in a remote power plant, industrial plants, office buildings, or a transport system and for controlling those devices.

As will later be described again with reference to a few of several figures of the accompanying drawing, an optical data transmission system usually comprises an optical fiber cable and a plurality of data bus couplers, each comprising a transmitter and a receiver. The transmitters and the receivers are coupled to the optical fiber cable. The transmitter and the receiver of one of the data bus couplers may be connected to a central processing unit, with the transmitters and the receivers of the other data bus couplers connected to the devices of the type exemplified above. The transmitter connected to the central processing unit sends commands and/or other data as optical pulses to the optical fiber cable. Responsive to the optical pulses, each receiver produces a received electrical signal and reproduces the commands and/or the data. One of the transmitters that is connected to the device specified by the commands with or without the data, converts data signals supplied from that device to optical pulses for transmission through the optical fiber cable. Supplied with the last-mentioned optical pulses, the receiver connected to the central processing unit reproduces the data sent back from the specified device.

The span between two adjacent data bus couplers may vary from a few meters to several kilometers. It is therefore very desirable that each receiver should comprise an automatic gain or threshold control circuit for shaping the received electrical signal into a sequence of correctly shaped pulses by carrying out peak detection of the received electrical signal.

The bit rate of the optical pulses may vary from zero (direct current) to the order of megabits per second. The peak detection fails to correctly shape the pulses whenever the bit rate becomes low. In this event, noise is amplified by the gain or threshold control circuit. Furthermore, not only are the pulses deformed but also errors appear in the pulse sequence when the automatic threshold control circuit is resorted to. The pulse distortion and errors are rendered more serious when the optical data transmission system comprises a greater number of data bus couplers.

An approach for removing the adverse effects caused on the automatic gain or threshold control when the bit rate becomes low, is therefore proposed by Hewlett-Packard Components, California, U.S.A., in pamphlets No. 5953-0375 "Fiber Optic Digital Receiver HFBR-2001" and No. 5953-0376 "Fiber Optic 100 Meter Digital Transmitter HFBR-1001" as tentative data June 1978. According to the proposal, a "refresh pulse" sequence is superposed on both high and low levels of the binary (two-level) data signals in the transmitter. The binary data signals are thereby converted to ternary (three-level) data signals in which pulses variable between high and medium levels are substituted for the high level of a long duration in the binary data signal and pulses variable between low and medium levels, for the low level of a long duration in the binary data signal.

The approach is effective in keeping the automatic gain or threshold control circuit in proper operation. The bit rate may vary from zero to as high as ten megabits per second. The ternary data signals, however, are ineffective in using the optical energy transmitted through the optical fiber cable. In other words, it becomes unavoidable to render the span between two adjacent data bus couplers short. This is necessary also for correct operation of the gain or threshold control circuit. Use of ternary data signals complicates the circuitry of the transmitter and the receiver. The ternary data signals become unbalanced when the electrooptical or the optoelectrical conversion characteristics are subjected to change either by the variation in the ambient temperature or as a result of the total time of use of an element for carrying out the conversion between the electrical and the optical pulses. Furthermore, the ternary pulses are subject to distortion because no consideration is given to instants of build up and down of the binary data pulses and the refresh pulses.

SUMMARY OF THE INVENTION

It is therefore an object of the present invention to provide an optical data transmission system which is capable of dealing with data of bit rates ranging from zero to a high bit rate.

It is another object of this invention to provide an optical data transmission system of the type described, with which it is possible to effectively use the optical energy transmitted through the system.

It is still another object of this invention to provide an optical data transmission system of the type described, through which it is possible to correctly transmit the data without distortion and/or errors in pulses representative of the data.

It is a further object of this invention to provide a transmitter, a receiver, and/or a data bus coupler for use in an optical data transmission system of the type described.

An optical data transmission system to which this invention is applicable comprises a transmitter and a receiver. The transmitter and the receiver are to be coupled to an optical fiber. The transmitter is for transmitting an optical binary signal to the receiver through the optical fiber.

According to this invention, the transmitter mentioned in the next preceding paragraph comprises first means responsive to an input binary signal taking a first and a second level at a time to represent at least one datum to be transmitted through the optical fiber for producing an electrical binary driving signal comprising a data signal component derived from the input binary signal. The data signal component comprises a first and a second portion having a third and a fourth level and derived from those portions of the input binary signal which have the first and the second levels, respectively. The first and the second portions immediately follow each other. The driving signal further comprises at least one pilot pulse component superposed only on the first portion that lasts longer than a predetermined interval of time. The at least one pilot pulse component is given the fourth level and made not to interfere with either of the second portions that next precedes and next succeeds the pilot pulse component superposed first portion. The driving signal is thereby given the fourth level during presence of each of the second portions and the at least one pilot pulse component. The transmitter further comprises electrooptical converter means for converting the driving signal to the optical binary signal with the optical binary signal given a fifth level when the driving signal has the fourth level.

The receiver comprises optoelectrical converter means for converting the optical binary signal received through the optical fiber to a received electrical signal given a sixth level substantially when the received optical binary signal has a seventh level corresponding to the fifth level and shaping means for shaping the received electrical signal into a received binary signal with reference to those portions of the received electrical signal which have the sixth level. The received binary signal comprises a received data signal component and at least one received pilot pulse component resulting from the data signal component and the at least one pilot pulse component comprised by the electrical binary driving signal. The receiver further comprises second means responsive to the received binary signal for removing therefrom the at least one received pilot pulse component to produce a reproduction of the input binary signal with removal of the at least one received pilot pulse component made not to interfere with the reproduction of the input binary signal.

According to this invention, there is also provided an optical data transmission system which comprises a plurality of data bus couplers, each comprising a transmitter and a receiver of the type specified above.

According to this invention, there is furthermore provided a transmitter and/or a receiver for use in whichever of the data transmission system specified above and/or a data bus coupler for use in a data transmission system of the type specified above.

In an optical data transmission system according to this invention, the optical signal transmitted through the optical fiber is a binary signal. The optical energy is therefore effectively used. This enables a receiver to be spaced wider from an adjacent transmitter as compared with the case where a ternary optical signal is transmitted through the optical fiber. When used as the received electrical signal shaping means, an automatic gain or threshold control circuit is kept in excellent operation by the pilot pulse component or components even when a receiver is widely spaced from an adjacent transmitter. This enables the system to deal with data of various bit rates, including a direct current datum, although the highest bit rate undergoes a certain limitation as will later be described in conjunction with an embodiment of this invention. Inasmuch as the pilot pulse component or components neither interfere with the data signal components after insertion nor with the reproduced binary signal after removal, it is possible to avoid distortion of the reproduced binary signal and errors therein. As is the case with the refresh pulses used in the transmitter and the receiver proposed by Hewlett-Packard Components, it is possible to monitor the system by the use of the pilot pulses even in the absence of the data signals.

DESCRIPTION OF THE PREFERRED EMBODIMENTS

Figure 1:
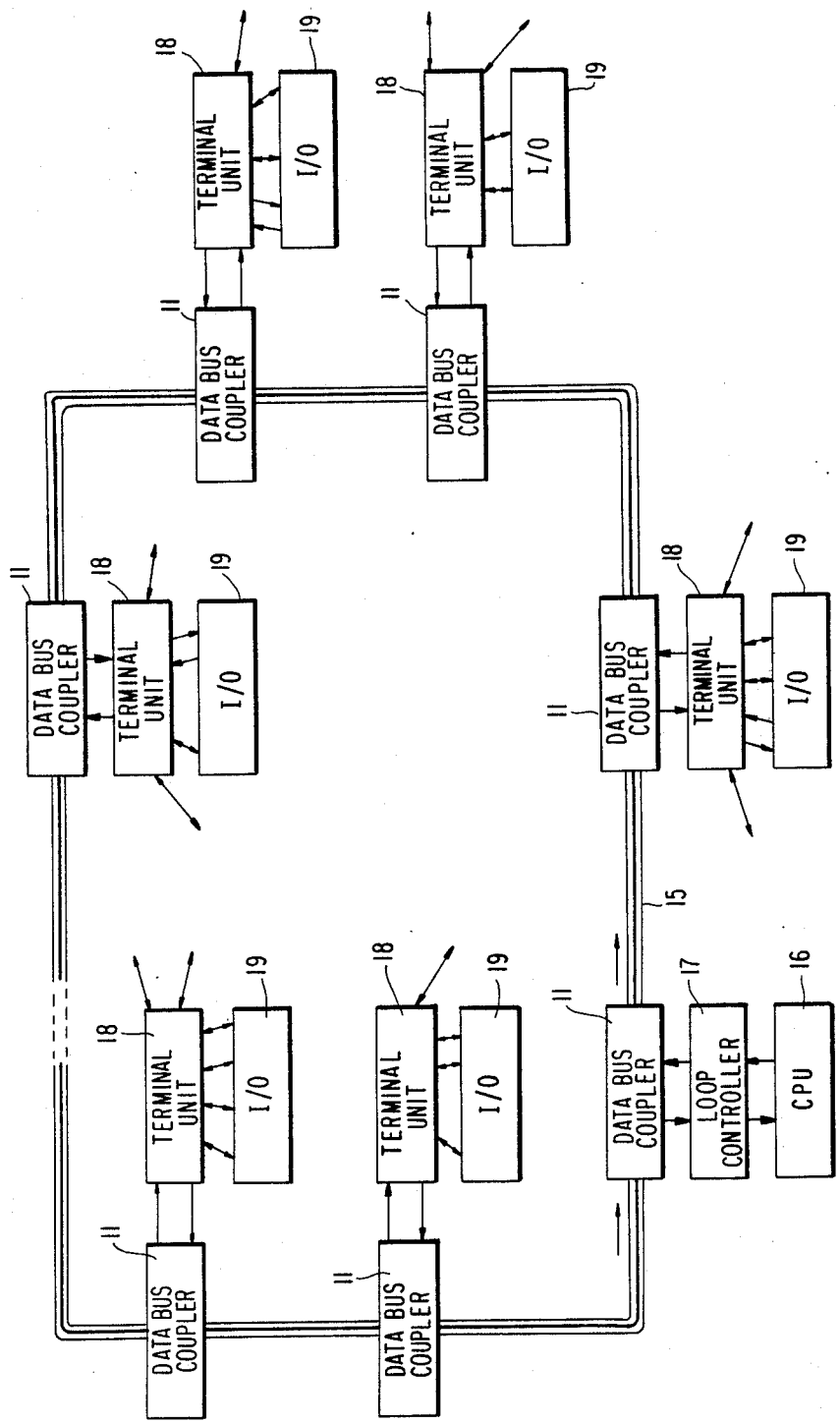
FIG. 1 schematically shows an optical data transmission system according to an embodiment of the instant invention, together with an optical fiber cable, a central processing unit, a plurality of data input/output devices, and other accompanying units.

Referring to FIG. 1, an optical data transmission system according to an embodiment of the present invention comprises a plurality of data bus couplers 11. As will later be described in detail, each data bus coupler 11 comprises a transmitter and a receiver. The transmitter of each data bus coupler 11 is for connection to the receiver of another of the data bus couplers 11 through an optical fiber cable 15. The optical data transmission system thereby becomes an optical data transmission loop for unidirectionally transmitting optical binary signals with the optical fiber cable 15 made to serve as a data bus. Preferably, the optical binary signals are transmitted through the optical fiber cable 15 as sequences or successions of optical on-off pulses of a single (same or free) wavelength.

A central processing unit 16 is connected to the optical fiber cable 15 through a loop controller 17, known in the art, and one of the data bus couplers 11. A plurality of terminal units 18, also known in the art, are connected to the optical fiber cable 15 through the remaining ones of the data bus couplers 11. Each terminal unit 18 is connected to at least one data input/output device 19 connected, in turn, to at least one accompanying device (not shown) of the type exemplified hereinabove. By the use of the optical binary signal, the central processing unit 16 makes the loop controller 17 specify one of the accompanying devices at a time and receives the data from the specified device. The data may be transmitted to at least one of the other accompanying devices.

Figure 2:
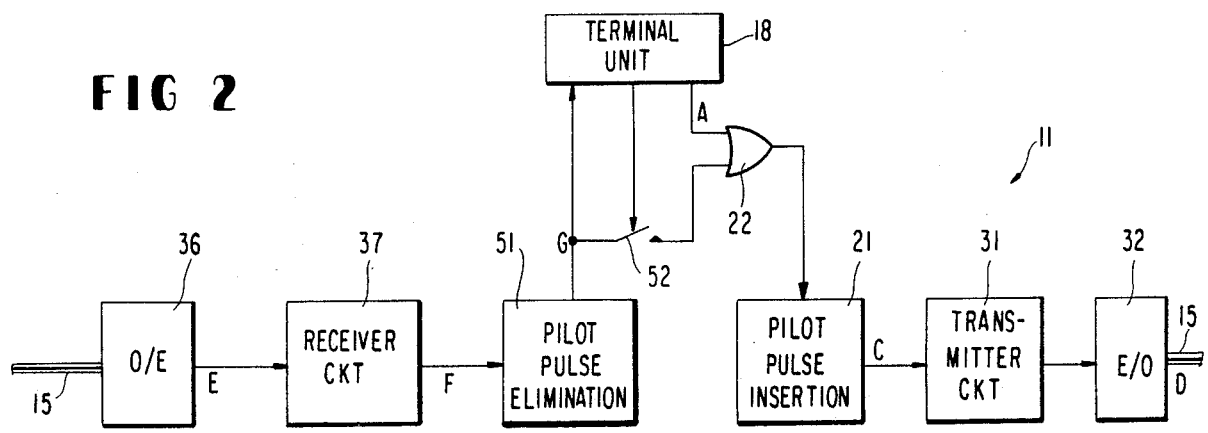
FIG. 2 shows in blocks a data bus coupler for use in the system depicted in FIG. 1, together with a terminal unit.

Referring to FIG. 2, each of the data bus couplers 11 connected to the respective terminal units 18 comprises a transmitter and a receiver connected to the optical fiber cable 15. The data bus coupler 11 connected to the loop controller 17 (FIG. 1) is similar in structure. An input binary signal or pulse sequence A produced by the illustrated terminal unit 18 is supplied to a pilot pulse inserting or superposing circuit 21 of the transmitter through an OR circuit 22. The pilot pulse inserting circuit 21 will presently be described and the OR circuit 22, later. The input binary signal A builds up from a low or first level to a high or second level with various pulse width and various pulse intervals according to at least one datum to be transmitted through the optical fiber cable 15 from the input/output device connected to the terminal unit 18.

Figure 3:
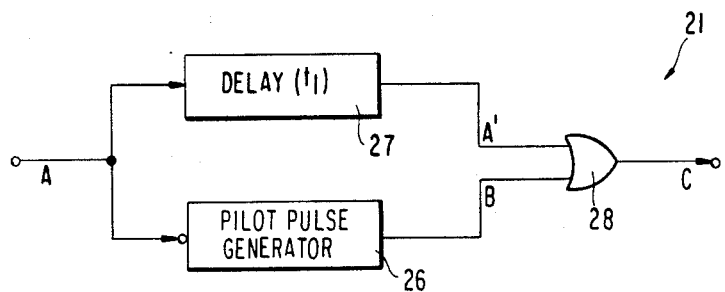
FIG. 3 is a block diagram of a pilot pulse inserting circuit for use in a transmitter comprised by the data bus coupler illustrated in FIG. 2.
Figure 4:
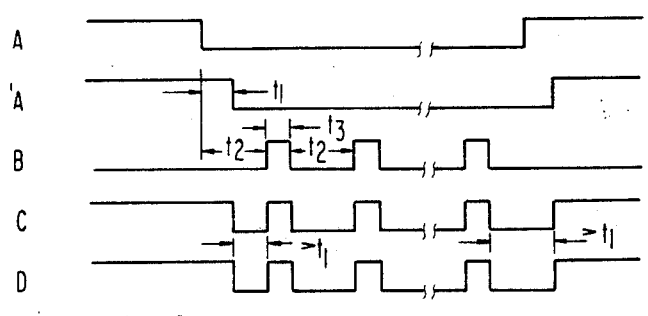
FIG. 4 exemplifies several signals that are used in the pilot pulse inserting circuit shown in FIG. 3.

Turning to FIGS. 3 and 4, an example of the pilot pulse inserting circuit 21 comprises a pilot pulse generator 26 responsive to the input binary signal A for generating a pilot pulse sequence B only while the input binary signal A has the low level. The pilot pulse inserting circuit 21 further comprises a combining circuit comprising a delay circuit 27 and an OR gate 28 for combining the pilot pulse sequence B with the input binary signal A to produce a pilot pulse inserted signal C under the conditions that will be described below.

In order to set forth the conditions, let it be mentioned here that the pilot pulse inserted signal C comprises a data signal component derived from the input binary signal A and a pilot pulse component derived from each pilot pulse of the sequence B. The data signal component comprises a first and a second portion having a low or third and a high or fourth level, respectively, and derived from those portions of the input binary signal A which have the low and the high levels, respectively. The first and the second portions immediately follow each other. In other words, each first portion begins at the trailing edge of a next preceding second portion and ends at the leading edge of a next succeeding second portion. Each pilot pulse component builds up to the fourth level and builds down to the third level. The first portion may or may not last longer than a predetermined interval of time $t_0$. The meaning of the predetermined interval $t_0$ will become clear as the description proceeds.

One of the conditions is such that at least one pilot pulse component should be superposed only on each first portion that lasts longer than the predetermined interval $t_0$. Another of the conditions is such that a first of the pilot pulse components should have a leading edge more than a first prescribed interval of time after the beginning of the above-mentioned each first portion, namely, the trailing edge of the next preceding second portion. Still another of the conditions is such that a last one of the pilot pulse components should have a trailing edge more than a second prescribed interval of time before the end of the above-mentioned each first portion, namely, the leading edge of the next following second portion. As will readily be understood, a sum of the first and the second prescribed intervals and the widest pulse width of the pilot pulse components should not be longer than the predetermined interval $t_0$. The first and the second prescribed intervals will shortly be exemplified more in detail.

More specifically referring to FIGS. 3 and 4, the delay circuit 27 gives a predetermined delay $t_1$ to the input binary signal A to produce a delayed binary signal A'. Let it now be assumed that any two adjacent pilot pulses of the sequence B are spaced apart from each other by a common preselected pulse interval $t_2$ and that the pilot pulses have a common preselected pulse width $t_3$. As is generally the case, the preselected pulse width $t_3$ is not wider than the preselected pulse interval $t_2$. In an example of the pilot pulse inserting circuit 21 to be detailed in the following, the preselected pulse width $t_3$ should not be wider than a half of the preselected pulse interval $t_2$. For the example being illustrated, the predetermined delay $t_1$ should be shorter than a half of the preselected pulse interval $t_2$ and longer than the preselected pulse width $t_3$. The pilot pulse generator 26 should generate a first pilot pulse of the sequence B the preselected pulse interval $t_2$ after build down of the input binary signal A and should not produce a pilot pulse if the input binary signal A builds up not later than an instant at which the last-mentioned pilot pulse would build down. At least one pilot pulse of the sequence B is therefore produced only when the input binary signal A has the low level longer than a sum of the preselected pulse interval $t_2$ plus the preselected pulse width $t_3$. It is now possible to understand that the predetermined interval $t_0$ is equal to the last-mentioned sum.

Responsive to the delayed binary signal A' and the pilot pulse sequence B, the OR gate 28 produces the pilot pulse inserted signal C. At least one pilot pulse component is thus superposed on a first data signal component portion that lasts longer than the predetermined interval $t_0$. A first of the pilot pulse components builds up more than the predetermined delay $t_1$ after the beginning of the first portion. A last one of the pilot pulse components build down more than the predetermined delay $t_1$ before the end of the first portion. It is now understood that a sum of the first and the second prescribed intervals should not be longer than either of the preselected pulse interval $t_2$ and the predetermined interval $t_0$ minus the preselected pulse width $t_3$ and that one of the first and the second prescribed intervals should be longer than the preselected pulse width $t_3$.

Turning back to FIG. 2, the pilot pulse inserted signal C is supplied to a transmitter circuit 31 for providing an electrical binary driving signal for an electrooptical converter 32 that may be an LED. Inasmuch as the transmitter circuit 31 is merely for current amplifying the pilot pulse inserted signal C, the binary driving signal comprises the data signal component and the pilot pulse component or components although the high and the low levels between which the driving signal is variable may not be equal to the fourth and the third levels. If an LED is used, the electrooptical converter 32 produces an optical binary signal that is rendered on and off as exemplified in FIG. 4 at D when the driving signal has the high and the low levels, respectively.

Further referring to FIG. 2, the receiver is supplied with the optical binary signal of a waveform similar to that exemplified in FIG. 4 at D from the data bus coupler 11 connected either to the central processing unit 16 (FIG. 1) or another of the terminal units 18. As compared with the optical binary signal produced at the transmitter, the received optical binary signal undergoes a certain degree of attenuation while being transmitted through the optical fiber cable 15 and also through optical fiber connectors (not shown) which are usually used in connecting the optical fiber cable 15 with each data bus coupler 11. The received optical binary signal is, however, rendered on and off substantially when the optical binary signal D is made on and off, respectively, at the transmitter. In any event, an optoelectrical converter 36 converts the received optical binary signal to a received electrical signal E. When used as the optoelectrical converter 36, a p-i-n photodiode develops the received electrical signal E across an output resistor to be presently described. The received electrical signal E comprises a first and a second portion having a low and a high level, respectively, when the received optical binary signal is rendered off and on, respectively.

The received electrical signal E is supplied to a receiver circuit 37 comprising a shaping circuit, such as an automatic gain or threshold circuit to be described in the following, for shaping the received electrical signal E into a received binary signal F that comprises a data signal component and may further comprise at least one pilot pulse inserted signal C or the electrical binary driving signal. As described, the received electrical signal shaping circuit fails to correctly operate should the first received electrical signal portion last longer than a certain interval of time, which will herein be called a predetermined portion duration. The predetermined interval $t_0$ should not be longer than the predetermined portion duration.

Figure 5:
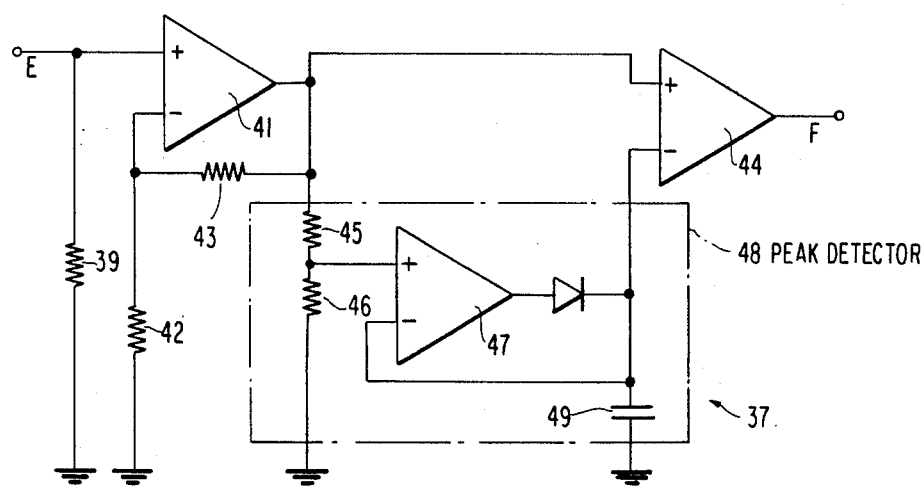
FIG. 5 is a block diagram of a receiver circuit for use in a receiver comprised by the data bus coupler illustrated in FIG. 2.

Referring temporarily to FIG. 5, a receiver circuit 37 comprising an automatic threshold control circuit is supplied with the received electrical signal E developed across the p-i-n photodiode output resistor depicted at 39. A first operational amplifier 41 has a non-inverted terminal supplied with the received electrical signal E and an inverted terminal grounded through a resistor 42 and fed back with a received and amplified signal through a feedback resistor 43. The amplified signal is supplied to a non-inverted terminal of a comparator 44 and, after divided by two by a potential divider comprising equal resistors 45 and 46, to a non-inverted terminal of a second operational amplifier 47 of a peak detector 48. Through a diode, the output signal of the second operational amplifier 47 is fed back to an inverted terminal to provide a feedback loop of a gain equal to unity and is used to charge a capacitor 49. The voltage developed across the capacitor 49 provides a threshold signal of a level equal to a half of the peak value of the received electrical signal E unless the first received electrical signal portion lasts longer than the predetermined portion duration. Supplied with the threshold signal at an inverted terminal, the comparator 44 produces the received binary signal F.

Reviewing FIGS. 3 through 5, the capacitor 49 is shunted by an equivalent impedance comprising the input impedance of the comparator 44 and that of the second operational amplifier 47. When the capacitance and the equivalent impedance are 30 microfarads and 20 kiloohms, the time constant of the automatic threshold control circuit 0.6 second. The received binary signal F would appreciably be deteriorated if the first received electrical signal portion would last approximately equal to the time constant. It is now possible to understand that the predetermined portion duration is equal to the time constant. The predetermined delay $t_1$, the preselected pulse interval $t_2$, and the preselected pulse width $t_3$ are therefore typically rendered equal to 400 nanoseconds, 5 microseconds, and 200 nanoseconds, respectively, in which case the predetermined interval $t_0$ is 5.2 microseconds.

Turning back to FIG. 2 once again, a pilot pulse eliminating or removing circuit 51 is responsive to the received binary signal F for removing therefrom the pilot pulse component or components included therein to produce a reproduction G of the input binary signal. The reproduced binary signal G is supplied to the accompanying terminal unit 18 and is representative of the commands generated by the central processing unit 16 (FIG. 1), the data collected at another of the terminal units 18, and the like. A switch 52 is operable in response to a switching signal produced by the associated terminal unit 18 either in response to the commands or under certain circumstances to supply the reproduced binary signal G to the transmitter through the OR circuit 22.

Figure 6:
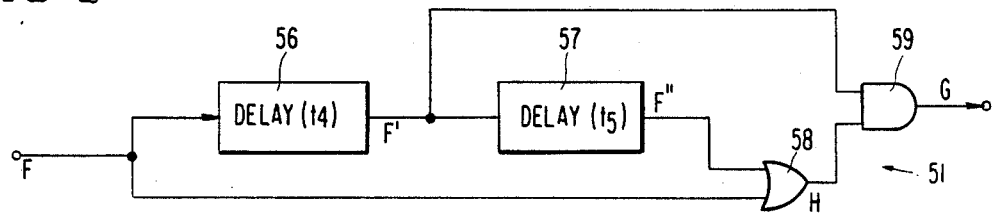
FIG. 6 is a block diagram of a pilot pulse eliminating circuit for use in the receiver mentioned in conjunction with FIG. 5.
Figure 7:
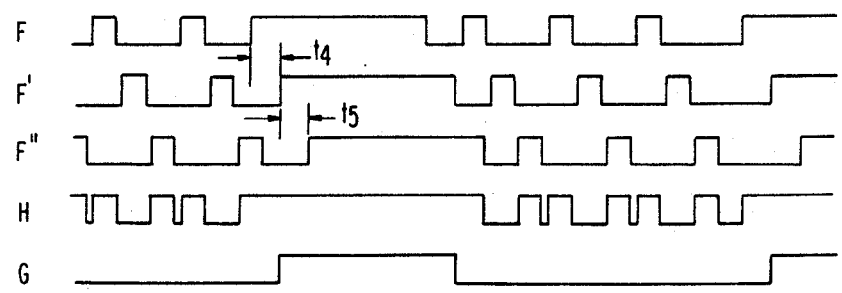
FIG. 7 exemplifies several signals that appear in the pilot pulse eliminating circuit depicted in FIG. 6.

Referring now to FIGS. 6 and 7, an example of the pilot pulse eliminating circuit 51 comprises first and second delay circuit 56 and 57 for successively giving first and second preselected delays $t_4$ and $t_5$ to the received binary signal F to produce first and second delayed signals F' and F'', respectively. Each of the first and the second preselected delays $t_4$ and $t_5$ should be equal to or less than the predetermined delay $t_1$ and should be equal to or greater than the preselected pulse width $t_3$. Inasmuch as the preselected pulse interval $t_2$ is longer than twice the predetermined delay $t_1$ in the example being illustrated, a sum of the preselected pulse interval $t_2$ and the preselected pulse width $t_3$ is longer than another sum of the first and the second preselected delays $t_4$ and $t_5$. The second preselected delay $t_5$ may be equal to the first preselected delay $t_4$. It is now possible to eliminate the at least one received pilot pulse component from the received binary signal F by means of a logic circuit comprising an OR gate 58 and an AND gate 59 responsive to the received binary signal F and the first and the second delayed signals F' and F''. The elimination of the pilot pulse component or components does not interfere with the reproduced binary signal G at all if the second received electrical signal portions last always longer than a sum of the first and the second preselected delays $t_4$ and $t_5$.

More particularly, the OR gate 58 produces an OR'ed signal H in response to the received binary signal F and the second delayed signal F''. The pilot pulse components never simultaneously appear in the received binary signal F and the first and the second delayed signals F' and F''. A first pilot pulse component builds up in the first delayed signal F' after whichever the later of build down of the next preceding second received electrical signal portion in the second delayed signal F'' and build down of the first pilot pulse component in the received binary signal F. A last one of the pilot pulse components builds down in the first delayed signal F' before whichever the earlier of build up of the next following second received electrical signal portion in the received binary signal F and build up of the last pilot pulse component in the second delayed signal F''. When the second portion is longer than the first preselected delay $t_4$ plus the second preselected delay $t_5$ as described, the second portion appears in the first delayed signal F' while the OR'ed signal H has a high level. The AND gate 59 therefore produces the desired reproduction G of the input binary signal in response to the first delayed signal F' and the OR'ed signal H.

For the numerical examples of the predetermined delay $t_1$ and the preselected pulse interval and width $t_2$ and $t_3$ given above, each of the first and the second preselected delays $t_4$ and $t_5$ may be 300 nanoseconds. Under the circumstances, the optical data transmission loop is capable of dealing with data of bit rates ranging from zero up to 1.66 megabits per second.

While an embodiment of this invention has thus far been described together with specific examples of the pilot pulse inserting and eliminating circuits 21 and 51, it will now be obvious to those skilled in the art to derive various other embodiments of the invention. For example, this invention is applicable to an optical data transmission system comprising only one transmitter and only one receiver. Each data bus coupler 11 may comprise two transmitters and two receivers for connection to the optical fiber cable 15 through a pair of optical splitters, known in the art, for bidirectional transmission of the optical binary signals. In this event, it is possible to connect the data bus couplers 11 in an open link rather than in a loop. An optical data transmission loop or link may be for connection to two or more central processing units. It is possible to use optical binary signals of different (fixed) wavelengths and two or more optical fiber cables, to which each data bus coupler 11 should be coupled. Although called an optical data transmission system, those claimed in the appended claims need not comprise an optical fiber as an indispensable element but only as an element to be used when a transmitter and a receiver of the claimed system is to be put into practical operation.

The polarities of the pilot pulses and other signals, including the signal for keeping the peak detector 48 in proper operation, are optional provided that inverters are used so as to superpose the pilot pulse component or components in the electrical binary driving signal on a data signal component portion of a level different from that to which the pilot pulse component either builds up or builds down. A pilot pulse sequence is thus inserted between two wide spaced successions of data signals.

It is possible to render the interval and the width of the pilot pulses variable and to select the interval from the build up or down of the input binary signal A to generation of the first pilot pulse in the pilot pulse sequence B in various manners provided that the insertion and the subsequent removal of the pilot pulse component or components do not interfere with the reproduced binary signal G. For example, it is possible to give an optional delay both to the delayed binary signal A' and the pilot pulse sequence B with the predetermined delay $t_1$ lengthened accordingly, even longer than a half of the preselected pulse interval $t_2$. On the contrary, the interval between the build down of the input binary signal A and the build up of the first pilot pulse may only be longer than twice the preselected pulse width $t_3$. At any rate, elimination of the received pilot pulse component or components is made not to interfere with the reproduced binary signal G when carried out in consideration of the first and the second prescribed intervals and the preselected pulse width $t_3$. Incidentally, it is possible when the pilot pulse inserted signal C is not specifically taken into consideration to call those levels a third and a fourth level, between which the data signal component and the at least one pilot pulse component are variable in the electrical binary driving signal.

What is claimed is:

1. An optical data transmission system comprising a transmitter and a receiver, said transmitter and said receiver being coupled to an optical fiber, said transmitter being for transmitting data as an optical binary signal (D) to said receiver through said optical fiber;

said transmitter comprising:

delay means for giving a predetermined delay ($t_1$) to an input binary signal (A) taking a first and a second level at a time depending on said data to produce a delayed binary signal (A') comprising a first and a second portion having a third and a fourth level and derived with said predetermined delay from those portions of said input binary signals which have said first and said second levels, respectively;

pilot pulse generating means responsive to said input binary signal for generating a sequence (B) of pilot pulses at a preselected pulse interval ($t_2$), each pilot pulse having a preselected pulse width ($t_3$) not wider than a half of said pulse interval, a leading edge varying from one to the other of said third and said fourth levels, and a trailing edge varying from said other to said one of the third and the fourth levels and being generated only when that portion of said input binary signal which has said first level lasts not shorter than a sum of said pulse interval and said pulse width after either of a leading edge of the last-mentioned portion or the trailing edge of a pilot pulse next preceding said each pilot pulse, said predetermined delay being shorter than a half of said pulse interval and longer than said pulse width;

logic circuit means for combining said pilot pulse sequence and said delayed binary signal to produce an electrical binary driving signal comprising said first and said second portions with a pilot pulse component superposed with said fourth level on the first portion lasting longer than said sum only during presence of each pilot pulse, said pilot pulse component disappearing when the pilot pulse coexists with said second portion; and electrooptical converter means for converting said driving signal to said optical binary signal with said optical binary signal given a fifth level when said driving signal has said fourth level;

said receiver comprising:

optoelectrical converter means for converting the optical binary signal received through said optical fiber to a received electrical signal (E) given a sixth level substantially when the received optical binary signal has a seventh level corresponding to said fifth level;

shaping means for shaping said received electrical signal into a received binary signal (F) with reference to those portions of said received electrical signal which have said sixth level, said received binary signal comprising a data signal component and a received pilot pulse component resulting from the second portion and the pilot pulse component comprised by said electrical driving signal; and received pilot pulse component removing means responsive to said received binary signal for removing therefrom said received pilot pulse component to produce a reproduction (G) of said input binary signal.

2. An optical data transmission system comprising a plurality of data bus couplers, each comprising a transmitter and a receiver, the transmitters and the receivers of said data bus couplers being adapted to be coupled to an optical fiber serving as a data bus, each of said transmitters being for transmitting data as an optical binary signal to any one of said receivers through said optical fiber;

each of said transmitters comprising:

delay means for giving a predetermined delay to an input binary signal taking a first and a second level at a time depending on said data to produce a delayed binary signal comprising a first and a second portion having a third and fourth level and derived with said predetermined delay from those portions of said input binary signal which have said first and said second levels, respectively;

pilot pulse generating means responsive to said input binary signal for generating a sequence of pilot pulses at a preselected pulse interval, each pilot pulse having a preselected pulse width not wider than a half of said pulse interval, a leading edge varying from one to the other of said third and said fourth levels, and a trailing edge varying from said other to said one of the third and the fourth levels and being generated only when that portion of said input binary signal which has said first level lasts not shorter than a sum of said pulse interval and said pulse width after either of a leading edge of the last-mentioned portion or the trailing edge of a pilot pulse next preceding said each pilot pulse, said predetermined delay being shorter than a half of said pulse interval and longer than said pulse width;

logic circuit means for combining said pilot pulse sequence with said delayed binary signal to produce an electrical binary driving signal comprising said first and said second portions with a pilot pulse component superposed with said fourth level on the first portion lasting longer than said sum only during presence of each pilot pulse, said pilot pulse component disappearing when the pilot pulse coexists with said second portion; and electrooptical converter means for converting said driving signal to said optical binary signal with said optical binary signal given a fifth level when said driving signal has said fourth level;

each of said receivers comprising:

optoelectrical converter means for converting the optical binary signal received through said optical fiber to a received electrical signal given a sixth level substantially when the received optical binary signal has a seventh level corresponding to said fifth level;

shaping means for shaping said received electrical signal into a received binary signal with reference to those portions of said received electrical signal which have said sixth level, said received binary signal comprising a data signal component and a received pilot pulse component resulting from the second portion and the pilot pulse component comprised by said electrical driving signal; and received pilot pulse component removing means responsive to said received binary signal for removing therefrom said received pilot pulse component to produce a reproduction of said input binary signal.

3. An optical data transmission system as claimed in claim 1 or 2 wherein said shaping means is operative only when two adjacent ones of the received electrical signal portions having said sixth level are spaced shorter from each other than said sum.

4. An optical data transmission system as claimed in claim 3, wherein said removing means comprises means responsive to said received binary signal for removing therefrom said at least one received pilot pulse component in consideration of said first and said second prescribed portions and said preselected pulse width to produce said reproduction of the input binary signal with the removal of said at least one received pilot pulse component made not to interfere with said reproduction of the input binary signal.

5. An optical data transmission system as claimed in claim 3, wherein said removing means comprises:

a first delay circuit for giving a first preselected delay to said received binary signal to produce a first delayed signal, said first preselected delay being neither longer than a half of said preselected pulse interval nor shorter than said preselected pulse width;

a second delay circuit for giving a second preselected delay to said first delayed signal to produce a second delayed signal, said second preselected delay being neither longer than a half of said preselected pulse interval nor shorter than said preselected pulse width; and logic means responsive to said received binary signal and said first and said second delayed signals for producing said reproduction of the input binary signal.

* * * * *

UNITED STATES PATENT AND TRADEMARK OFFICE
CERTIFICATE OF CORRECTION

PATENT NO. : 4,317,235
DATED : February 23, 1982
INVENTOR(S) : Tsukada

It is certified that error appears in the above—identified patent and that said Letters Patent is hereby corrected as shown below:

Column 6, line 39, change "providing" to --producing--.

Signed and Sealed this

Twenty-fifth Day of May 1982

[SEAL]

Attest:

*Attesting Officer*

GERALD J. MOSSINGHOFF

*Commissioner of Patents and Trademarks*